US009495965B2

(12) United States Patent
Dvorak (10) Patent No.: US 9,495,965 B2
(45) Date of Patent: Nov. 15, 2016

(54) SYNTHESIS AND DISPLAY OF SPEECH COMMANDS METHOD AND SYSTEM

(71) Applicant: American Institutes for Research, Washington, DC (US)

(72) Inventor: Joseph Dvorak, Hampshire, IL (US)

(73) Assignee: American Institutes for Research, Washington, DC (US)

(*) Notice: Subject to any disclaimer, the term of this patent is extended or adjusted under 35 U.S.C. 154(b) by 59 days.

(21) Appl. No.: 14/491,655

(22) Filed: Sep. 19, 2014

(65) Prior Publication Data
US 2015/0088526 A1   Mar. 26, 2015

Related U.S. Application Data

(60) Provisional application No. 61/880,824, filed on Sep. 20, 2013.

(51) Int. Cl.
*G10L 15/193*   (2013.01)
*G10L 15/28*   (2013.01)
*G10L 15/22*   (2006.01)

(52) U.S. Cl.
CPC .......... *G10L 15/28* (2013.01); *G10L 2015/228* (2013.01)

(58) Field of Classification Search
CPC .............................. G10L 15/28; G10L 15/193

USPC .............................. 704/275, 270.1; 715/728
See application file for complete search history.

(56) References Cited

U.S. PATENT DOCUMENTS

| | | | | |
|---|---|---|---|---|
| 6,760,705 | B2 * | 7/2004 | Dvorak | 704/270.1 |
| 7,062,444 | B2 * | 6/2006 | He et al. | 704/275 |
| 7,137,126 | B1 * | 11/2006 | Coffman | G06F 17/30899 |
| | | | | 704/200 |
| 7,328,158 | B1 * | 2/2008 | Burridge | 704/231 |
| 7,610,547 | B2 * | 10/2009 | Wang et al. | 715/205 |
| 7,712,031 | B2 * | 5/2010 | Law | G10L 15/28 |
| | | | | 704/270 |
| 8,229,753 | B2 * | 7/2012 | Galanes et al. | 704/270.1 |
| 8,417,511 | B2 * | 4/2013 | Silva | G10L 15/193 |
| | | | | 704/231 |
| 8,566,103 | B2 * | 10/2013 | He | 704/270.1 |

* cited by examiner

*Primary Examiner* — Susan McFadden
(74) *Attorney, Agent, or Firm* — Steptoe & Johnson LLP (57) ABSTRACT

A construction and display of speech commands system that allows a user to simply read what is on an application that involves visual elements with which the user interacts, and in doing so, gives the appropriate commands to the speech recognition system for the task at hand. The construction and display of speech commands system may include a speech recognition system, a grammar builder module, and a speech enablement module. The construction and display of speech commands system may automatically generate a speech enabled application from generated speech grammar.

12 Claims, 7 Drawing Sheets

SYNTHESIS AND DISPLAY OF SPEECH COMMANDS METHOD AND SYSTEM

PRIORITY CLAIM

This application claim priority to U.S. patent application Ser. No. 61/880,824, filed Sep. 20, 2013, whose disclosure is hereby incorporated by reference in its entirety into the present disclosure.

TECHNICAL FIELD

The present invention relates to a speech recognition and construction and display of speech commands system. More specifically, the construction and display of speech commands system and method enables a user to simply read what is on an electronic application and website that involves visual elements with which the user interacts, and in doing so, give the appropriate commands to the speech recognition system for the task at hand.

BACKGROUND

Speech Recognition ("SR") can be a valuable aid in dictation and navigation of applications and web sites. However, speech recognition systems may have a very large number of commands that are applicable at any one time to the task at hand. It is often difficult for the user to remember the best commands to use for a specific task.

Current speech recognition systems often use pop up or other transient or permanent windows to display a list of the commands that are available at any one time. However, this list may become lengthily and finding the desired command in the list can take some time. In addition, such lists may show the commands separated from the context in which they would be applied.

SUMMARY

In general, a construction and display of speech commands system may allow a user to simply read what is on an application that involves visual elements with which the user interacts, and in doing so, gives the appropriate commands to the speech recognition system for the task at hand. A list of commands is not utilized. This disclosure describes the process which may be used to take specific content of a web page and convert it into appropriate speech commands. The application may be a webpage or may be any type of application that involves visual elements with which the user interacts may be processed by the construction and display of speech commands method and system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The details of one or more embodiments are set forth in the following detailed description of the invention and the accompanying drawings. Other objectives, features, and advantages of the invention will be more readily understood upon consideration of the following Detailed Description of the invention, taken in conjunction with the accompanying drawings, and with the claims.

DESCRIPTION OF DRAWINGS

The present invention is further described in the detailed description which follows, in reference to the noted plurality of drawings by way of non-limiting examples of certain embodiments of the present invention, in which like numerals represent like elements throughout the several views of the drawings, and wherein.

DETAILED DESCRIPTION

A detailed explanation of the system and method according to the preferred embodiments of the present invention are described below.

Figure 1:
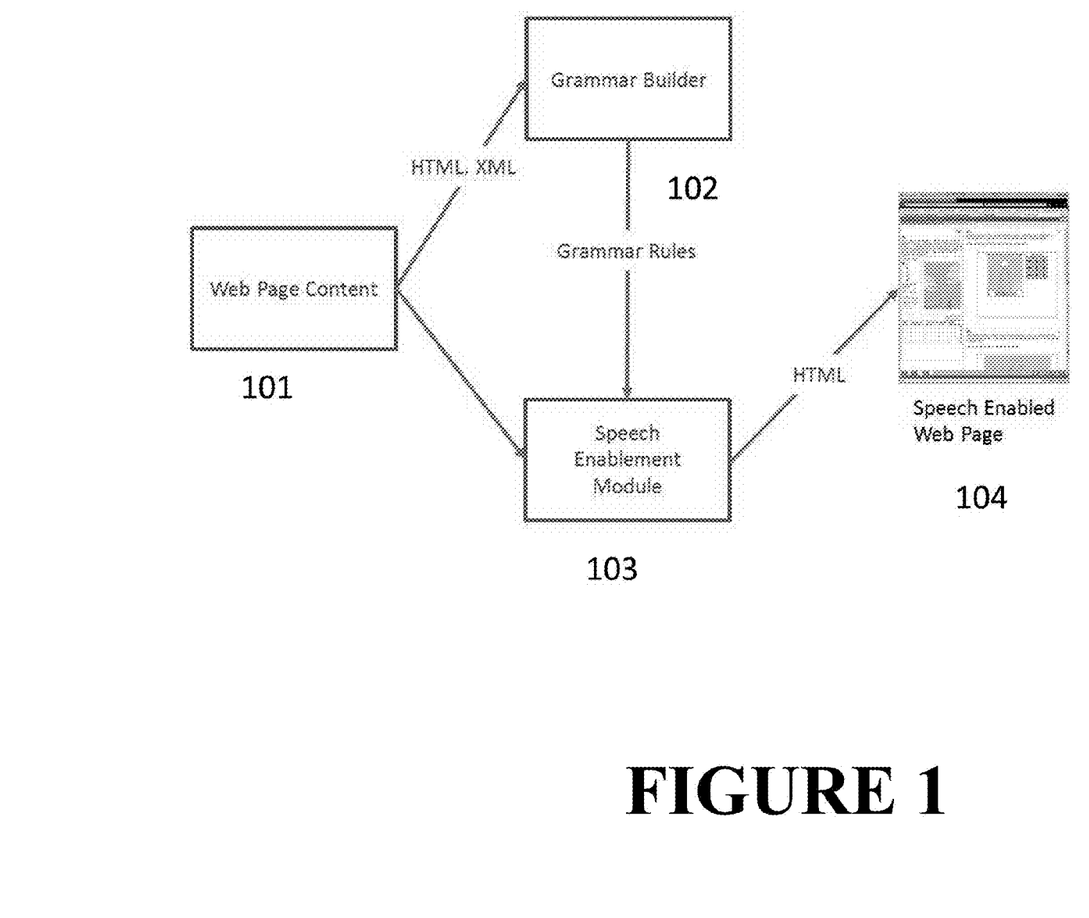
FIG. 1 depicts a process flow chart of a construction and display of speech command system.

Referring to FIG. 1, content for the web page 101 (HTML, XML, etc.), or any type of application that involves visual elements with which a user interacts, may be input to the Grammar Builder 102. The Grammar Builder may parse the web and application content and creates a speech grammar. The system may utilize java script classes. The rules of the speech grammar may be input to the Speech Enablement Module 103 along with the web and application content. The grammar rules may be used by the Speech Enablement Module to modify key elements of the web and application content to conform to the grammar rules. A speech enabled web page 104 may be generated. The elements modified may include, but are not limited to, HTML element labels, button text, and item titles. These elements may be modified to reflect the commands defined by the grammar rules.

Figure 2:
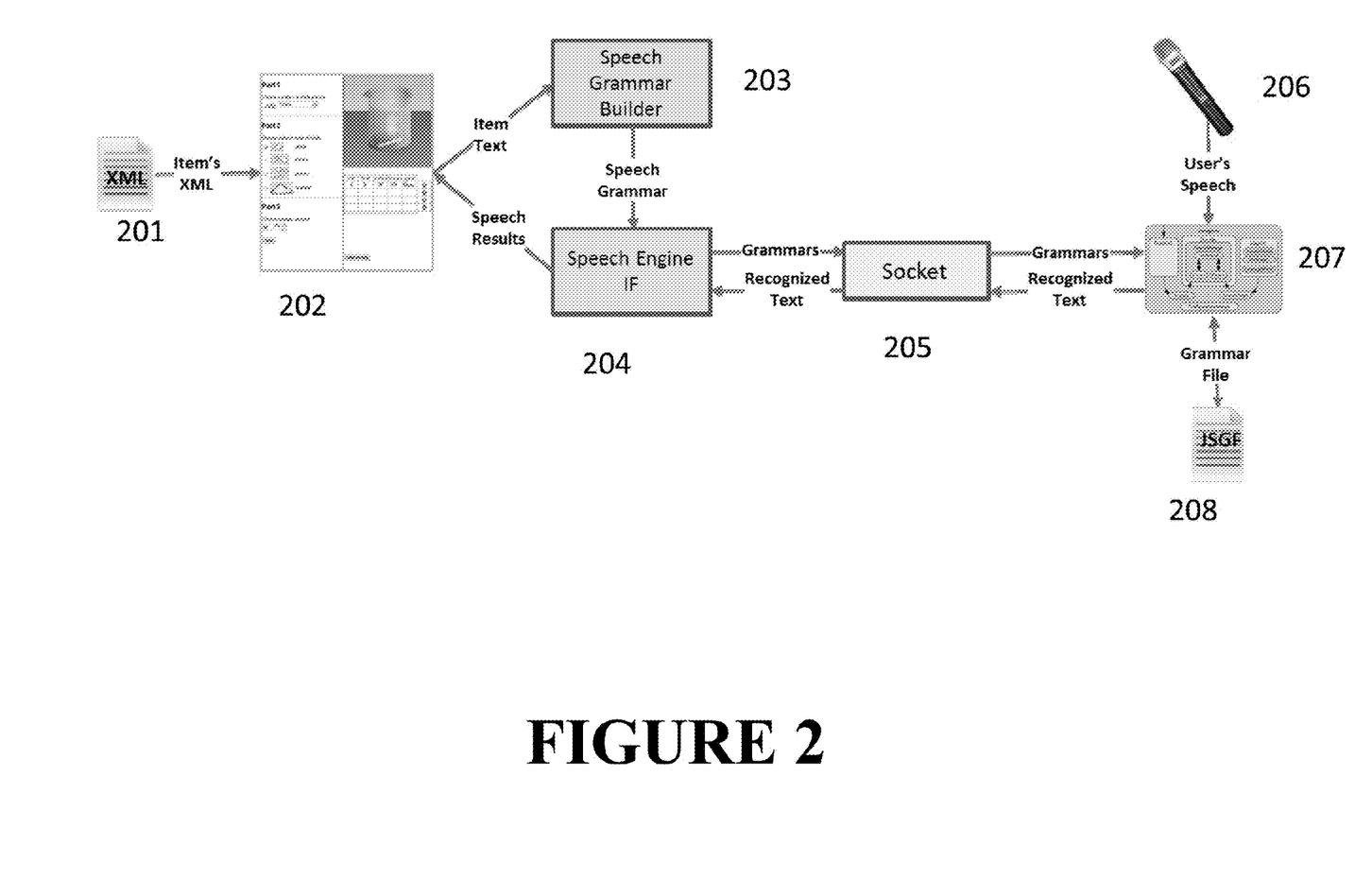
FIG. 2 illustrates the architecture of a construction and display of speech command system.

Referring to FIG. 2, the construction and display of speech commands system may parse an XML file 201 and construct the speech grammar for a particular item (202-204, 207-208) that has established socket connection 205 with the speech recognition engine. The system may convert item element titles and value labels to a spoken format:

1. Convert item element titles and value labels to spoken format
    1. Convert unit designations (cm→centimeter(s))
    2. Convert numbers (45→forty five)
    3. Convert symbols (%→percent)
    4. Add speech command prefix to each actionable visual label of item on test page
        1. Ex1: 'Number of Chalk Pieces'→'Move to Number of Chalk Pieces'
        2. Ex2: 'Whole Pieces'→'Select Whole Pieces'
2. Include any required support grammars
    1. Integer (−999999-999999)
    2. Number (Integer & decimal)
    3. Spoken Math (equations)
    4. Other required support grammars
3. Optimize grammar rule inclusion based on item data
4. Apply modifications to grammar rules based on student specific speech capabilities 5. Replace original item visual labels with derived speech labels
6. Highlight prefixed visual labels to mark them as speech commands The system may send the generated grammar to a recognizer and load it, a microphone may be activated 206, and the system may indicate that an item is ready for speech interaction.

The generated labels may be built in real time and may be stored in a flat file and/or a repository such as a database. Accordingly, the grammar rules that are automatically generated may be reusable.

The construction and display of speech commands system may include a module for adjusting visual labels based on a speech recognition performance ratio. The system may generate and maintain a record of recognition hit percentages, where the hit percentage may be: # utterances correctly recognized/total number of utterances. In one embodiment:

When the hit percentage<Accuracy threshold T:
1. For each visual label $l_i$, prefix label with Reduced Grammar Label, $r_i$
    Each $r_i$ is distinguished from the others by the use of a verbally unique naming system (For example, the NATO pronunciation alphabet)
    Ex1: 'Select number of chalk pieces'=>'Select Bravo: Number of Chalk Pieces'
2. Replace item's speech grammar with grammar for Reduced Grammar Labels
3. Replace visual labels with prefixed labels In another embodiment, if a specific user of a system has a speech impediment or utilized Braille, the grammar generated by the system may be modified to take into account that speech impediment.

Figure 3:
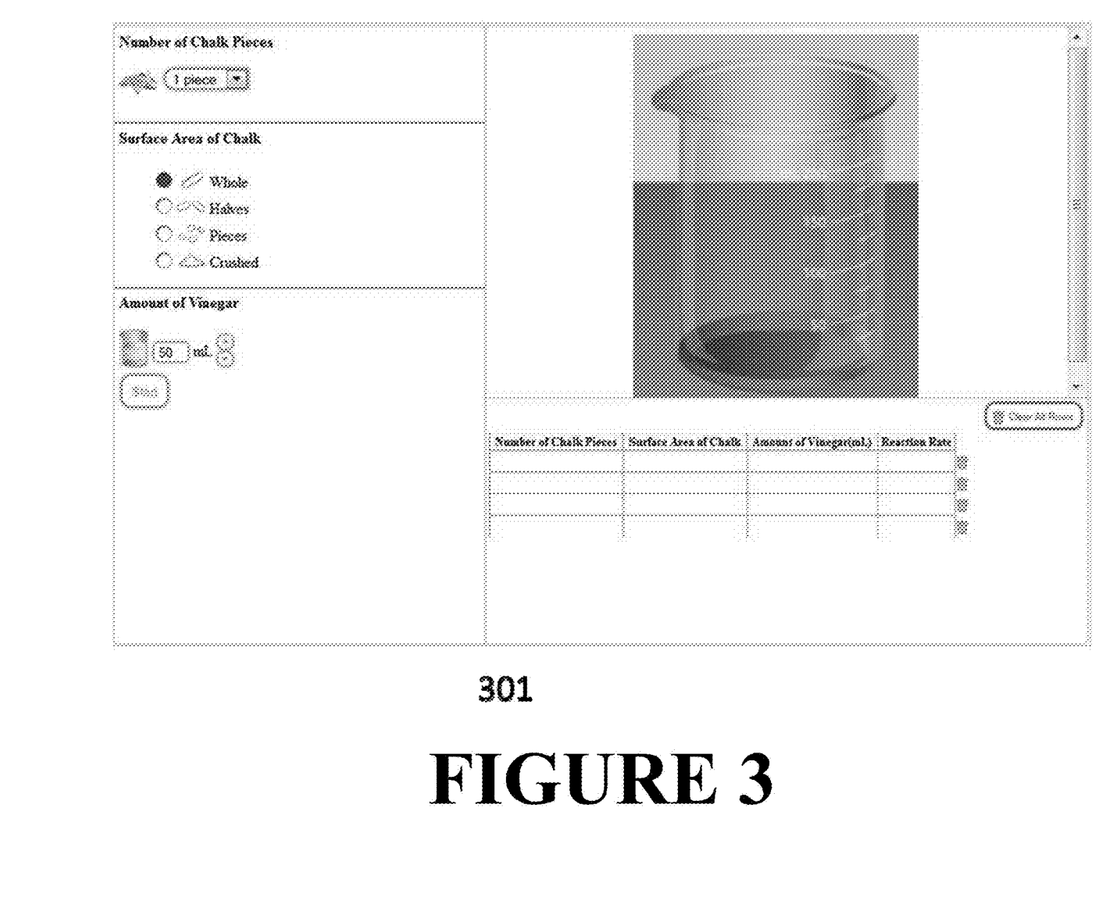
FIG. 3 illustrates a web page that is not speech enabled by a construction and display of speech command system.

Referring to FIG. 3, there may be several input and output elements that the user may manipulate with the keyboard and mouse 301. These may include the drop down menu, choice buttons, counter, buttons, and table (the trash can images to clear the row is also a button). The user may navigate among these elements and manipulate them.

Figure 4:
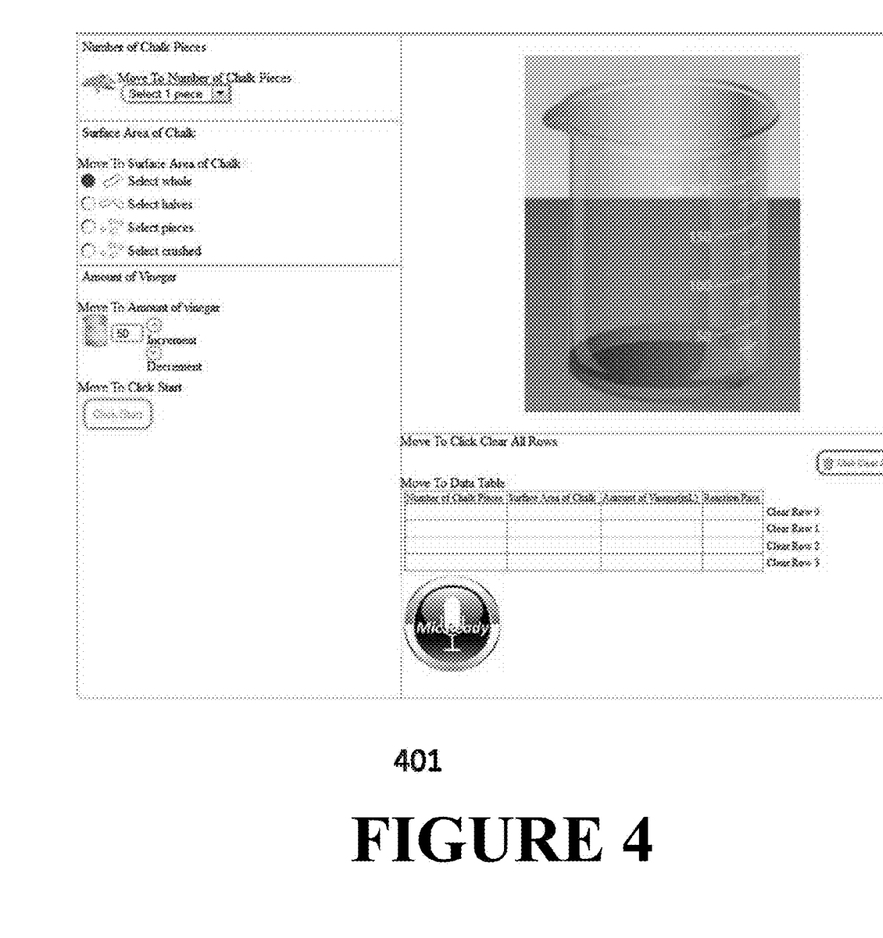
FIG. 4 illustrates a web page that has been speech enabled by a construction and display of speech command system.

Referring to FIG. 4, element labels may be modified to reflect the commands the user may speak to manipulate them 401. Additional labels may be modified and added to reflect the commands the user may use to move among the elements.

In one embodiment, to change the amount of vinegar in the solution from 50 ml to 150 ml (the step size is 50), the user may navigate to the counter element and increments the counter twice. The user dialog may be:

"move to amount of vinegar"
"increment"
"increment"

To activate the buttons, the user may simply speaks their labels ("click start" and "click clear all rows"). To clear a specific row of data in the table (say row 2) the user may navigate to the table and activate the trashcan button associated with the row to be cleared.

The user dialog may be:
"move to data table"
"clear row 2"

By simply speaking the various labels, the user may provide the SR system with the commands it recognizes. As such, the user may not need to remember any SR commands.

Figure 5:
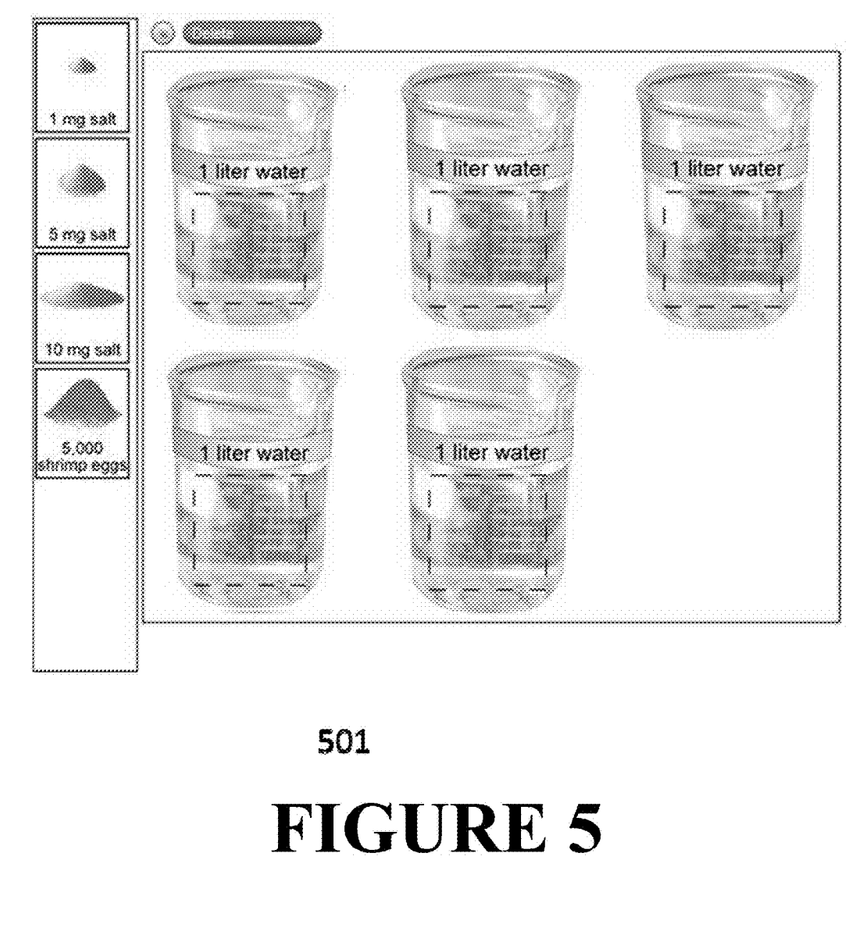
FIG. 5 illustrates an element that uses a palette of images which may be operated on by a construction and display of speech command system.

In another embodiment, the system and method for construction and display of speech commands may be utilized for and operated on an element that uses a palette of images. Referring to FIG. 5, a user may select an image with the mouse and may drag the image to a location on the element 501. To accomplish this using a SR without a construction and display of speech commands system, the user may have had to use commands to move the mouse to an image in the palette, select the image, and use drag the mouse to a valid location. This can be tedious and frustrating.

Figure 6:
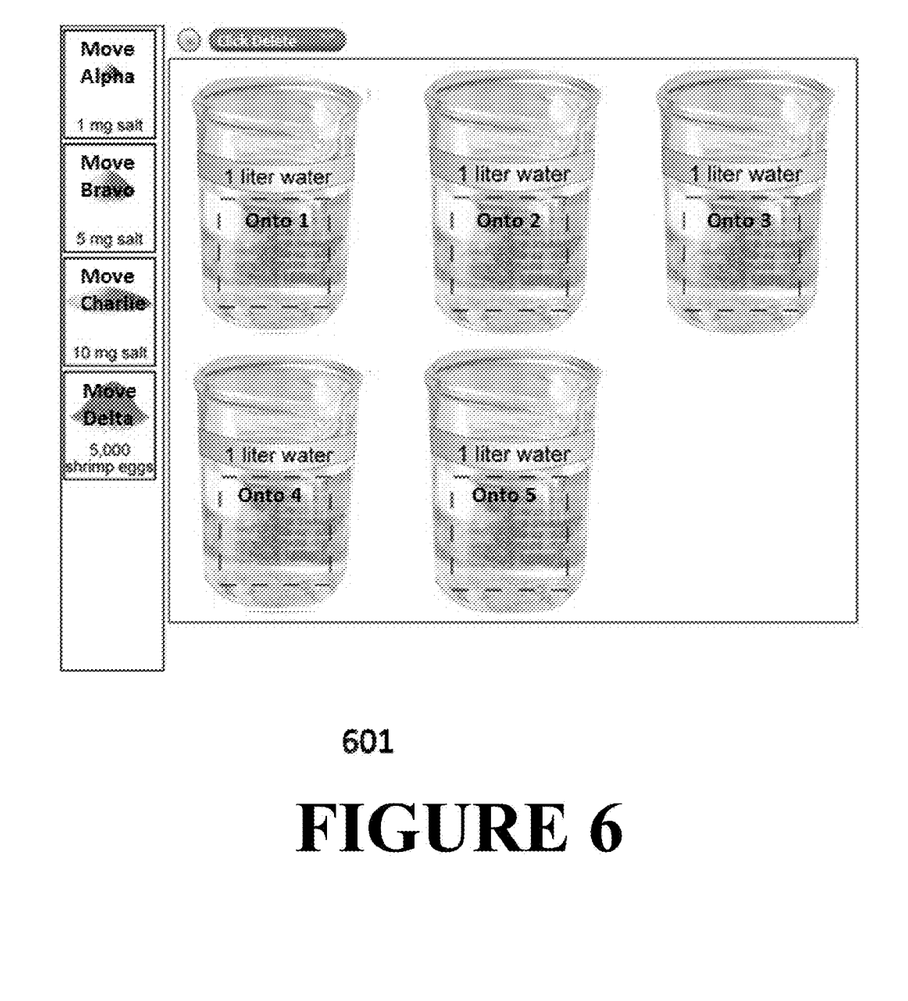
FIG. 6 depicts images being overlaid with part of the move command by a construction and display of speech command system.

Referring to FIG. 6, in one embodiment, images may be overlaid with part of the move command and the valid locations may be annotated with the completion of the move command 601 of a construction and display of speech command system. Selection is implicit in the first part of the command. For example, to select the $2^{nd}$ image and move it to the bottom left location, the user dialog would be:

"move bravo onto 4"

Figure 7:
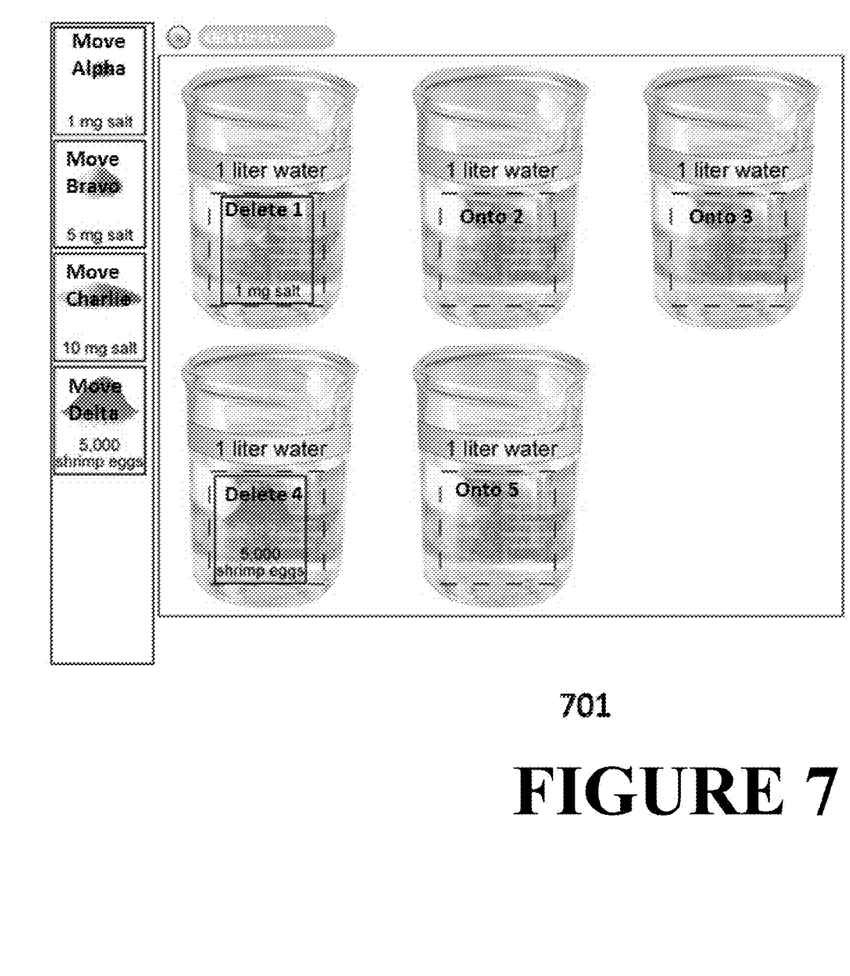
FIG. 7 depicts the processed images being overlaid with part of the move command by a construction and display of speech command system.

The result is shown in FIG. 7, 701. This process may allow for real time modification of speech oriented labels or titles to reflect changed contexts. For example, if the user selects the delete button (by saying "click delete") the overlays of all placed images may change to display the delete command. To delete the image placed at the lower left location, the user dialog may be:

"delete 1"

Other mechanisms may be employed with this process as well to provide readable speech commands for application and web page elements.

The embodiments of the construction and display of speech commands system and method may take the form of a hardware embodiment, a software embodiment, or an embodiment combining software and hardware. The construction and display of speech commands system software application may be installed on a user's mobile device. In one embodiment, the present invention takes the form of a computer-program product that includes computer-useable instructions embodied on one or more computer-readable media. The various construction and display of speech commands system techniques, methods, and systems described herein can be implemented in part or in whole using computer-based systems and methods. Additionally, computer-based systems and methods can be used to augment or enhance the functionality described herein, increase the speed at which the functions can be performed, and provide additional features and aspects as a part of or in addition to those described elsewhere in this document. Various computer-based systems, methods and implementations in accordance with the described technology are presented below.

Referring to construction and display of speech commands system shown in FIG. 1, the system, may include a general-purpose computer and can have an internal or external memory for storing data and programs such as an operating system (e.g., DOS, Windows 2000™, Windows XP™, Windows NT™, OS/2, UNIX or Linux) and one or more application programs. Examples of application programs include computer programs implementing the techniques described herein for lyric and multimedia customization, authoring applications (e.g., word processing programs, database programs, spreadsheet programs, or graphics programs) capable of generating documents or other electronic content; client applications (e.g., an Internet Service Provider (ISP) client, an e-mail client, or an instant messaging (IM) client) capable of communicating with other computer users, accessing various computer resources, and viewing, creating, or otherwise manipulating electronic content; and browser applications (e.g., Microsoft's Internet Explorer) capable of rendering standard Internet content and other content formatted according to standard protocols such as the Hypertext Transfer Protocol (HTTP). One or more of the application programs can be installed on the internal or external storage of the general-purpose computer. Alternatively, in another embodiment, application programs can be externally stored in or performed by one or more device(s) external to the general-purpose computer. In an embodiment, the construction and display of speech commands system modules may be application programs.

In addition, a client device may be or can include a desktop computer, a server, a laptop computer or other mobile computing device, a network-enabled cellular telephone (with or without media capturing/playback capabilities), wireless email client, or other client, machine or device to perform various tasks including Web browsing, search, electronic mail (email) and other tasks, applications and functions.

The general-purpose computer may include a central processing unit (CPU) for executing instructions in response to commands, and a communication device for sending and receiving data. One example of the communication device is a modem. Other examples include a transceiver, a communication card, a satellite dish, an antenna, a network adapter, or some other mechanism capable of transmitting and receiving data over a communications link through a wired or wireless data pathway.

The general-purpose computer may also include an input/output interface that enables wired or wireless connection to various peripheral devices. Examples of peripheral devices include, but are not limited to, a mouse, a mobile phone, a personal digital assistant (PDA), a keyboard, a display monitor with or without a touch screen input, and an audiovisual input device. In another implementation, the peripheral devices may themselves include the functionality of the general-purpose computer. For example, the mobile phone or the PDA may include computing and networking capabilities and function as a general purpose computer by accessing a network and communicating with other computer systems. Examples of a network include the Internet, the World Wide Web, WANs, LANs, analog or digital wired and wireless telephone networks (e.g., Public Switched Telephone Network (PSTN), Integrated Services Digital Network (ISDN), and Digital Subscriber Line (xDSL)), radio, television, cable, or satellite systems, and other delivery mechanisms for carrying data. A communications link can include communication pathways that enable communications through one or more networks.

In one implementation, a processor-based system of the general-purpose computer can include a main memory, preferably random access memory (RAM), and can also include a secondary memory. The secondary memory can include, for example, a hard disk drive or a removable storage drive, representing a floppy disk drive, a magnetic tape drive, an optical disk drive (Blu-Ray, DVD, CD drive), magnetic tape, paper tape, punched cards, standalone RAM disks, Iomega Zip drive, etc. The removable storage drive can read from or write to a removable storage medium. A removable storage medium can include a floppy disk, magnetic tape, optical disk (Blu-Ray disc, DVD, CD) a memory card (CompactFlash card, Secure Digital card, Memory Stick), paper data storage (punched card, punched tape), etc., which can be removed from the storage drive used to perform read and write operations. The removable storage medium can include computer software or data.

In alternative embodiments, the secondary memory can include other similar means for allowing computer programs or other instructions to be loaded into a computer system. Such means can include, for example, a removable storage unit and an interface. Examples of such can include a program cartridge and cartridge interface (such as the found in video game devices), a removable memory chip (such as an EPROM or PROM) and associated socket, and other removable storage units and interfaces, which allow software and data to be transferred from the removable storage unit to the computer system.

In one embodiment, network can also include a communications interface that allows software and data to be transferred between a client device, centralized server, the other components of the construction and display of speech commands system, and other ancillary systems. The modules of the construction and display of speech commands system may also be stand-alone components that can communicate with each other, a centralized server, and/or a client device over a network. Examples of communications interfaces can include a modem, a network interface (such as, for example, an Ethernet card), a communications port, and a PCMCIA slot and card. Software and data transferred via a communications interface may be in the form of signals, which can be electronic, electromagnetic, optical or other signals capable of being received by a communications interface. These signals may be provided to a communications interface via a channel capable of carrying signals and can be implemented using a wireless medium, wire or cable, fiber optics or other communications medium. Some examples of a channel can include a phone line, a cellular phone link, an RF link, a network interface, and other suitable communications channels.

In this document, the terms "computer program medium" and "computer readable medium" are generally used to refer to media such as a removable storage device, a disk capable of installation in a disk drive, and signals on a channel. These computer program products may provide software or program instructions to a computer system. The bi-directional interface system software application may be installed on a user's mobile device.

Computer-readable media include both volatile and non-volatile media, removable and non-removable media, and contemplate media readable by a database, a switch, and various other network devices. Network switches, routers, and related components are conventional in nature, as are means of communicating with the same. By way of example, and not limitation, computer-readable media include computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, DVD, holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Computer programs which may be associated with applications of the modules of the construction and display of speech commands system may be stored in the main memory or secondary memory. Such computer programs can also be received via a communications interface. Such computer programs, when executed, may enable the computer system to perform the features as discussed herein. In particular, the computer programs, when executed, may enable the processor to perform the described techniques. Accordingly, such computer programs may represent controllers of the computer system.

In an embodiment where the elements are implemented using software, the software can be stored in, or transmitted via, a computer program product and loaded into a computer system using, for example, a removable storage drive, hard drive or communications interface. The control logic (software), when executed by the processor, may cause the processor to perform the functions of the techniques described herein.

In another embodiment, the elements may be implemented primarily in hardware using, for example, hardware components such as PAL (Programmable Array Logic) devices, application specific integrated circuits (ASICs), or other suitable hardware components. Implementation of a hardware state machine so as to perform the functions described herein will be apparent to a person skilled in the relevant art(s). In yet another embodiment, elements may be implanted using a combination of both hardware and software.

In another embodiment, the computer-based methods can be accessed or implemented over the World Wide Web by providing access via a Web Page to the methods described herein. Accordingly, the Web Page may be identified by a Universal Resource Locator (URL). The URL may denote both a server and a particular file or page on the server. In this embodiment, it is envisioned that a client computer system, which may be a client device, may interact with a browser to select a particular URL, which in turn may cause the browser to send a request for that URL or page to the server identified in the URL. Typically, the server may respond to the request by retrieving the requested page and transmitting the data for that page back to the requesting client computer system, which may be a client device (the client/server interaction may be typically performed in accordance with the hypertext transport protocol or HTTP). The selected page may then be displayed to the user on the client's display screen. The client can then cause the server containing a computer program to launch an application, for example, to perform an analysis according to the described techniques. In another implementation, the server can download an application to be run on the client to perform an analysis according to the described techniques.

From the foregoing, it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of appended claims.

The invention claimed is:

1. A construction and display of speech commands system comprising:
   a speech recognition system;
   a centralized server;
   a grammar builder module, wherein the grammar builder module parses content of an application to generate speech grammar; and
   a speech enablement module, wherein the speech enablement module processes grammar rules to modify said content into generated speech commands, conforming to said grammar rules, and providing the generated speech commands to the speech recognition system;
   wherein the construction and display of speech commands system is configured to generate a speech enabled application from said generated speech grammar; and
   wherein the speech recognition system, centralized server, grammar builder module, speech enablement module are integrated with each other.

2. The construction and display of speech commands system of claim 1 wherein the application is a web page.

3. The construction and display of speech commands system of claim 1 wherein the generated speech grammar and speech enabled application is stored in a flat file.

4. The construction and display of speech commands system of claim 1 wherein the generated speech grammar and speech enabled application is stored in a repository.

5. The construction and display of speech commands system of claim 1 wherein the system comprises a speech recognition performance module, wherein said speech recognition performance module modifies the generated speech commands based on a speech recognition performance ratio.

6. A construction and display of speech commands system, comprising:
   a speech recognition system;
   a centralized server;
   a grammar builder module, wherein the grammar builder module parses content of an application to generate speech grammar;
   wherein the speech recognition system, centralized server, grammar builder module, speech enablement module are integrated with each other;
   a speech enablement module, wherein the speech enablement module is configured to process grammar rules to modify said content into generated speech commands, conforming to said grammar rules, and providing the generated speech commands to the speech recognition system;
   a speech recognition performance module, wherein said speech recognition performance module modifies the generated speech commands based on a speech recognition performance ratio, wherein the speech recognition performance ratio is based on a number of utterances correctly recognized to a total number of utterances; and
   wherein the construction and display of speech commands system is configured to generate a speech enabled application from said generated speech grammar.

7. A construction and display of speech commands method comprising:
   parsing content of an application to generate speech grammar via a grammar builder module;
   processing grammar rules to modify said content into generated speech commands conforming to said grammar rules via a speech enablement module, wherein the speech enablement module provides the generated speech commands to a speech recognition engine; and
   generating a speech enabled application from said generated speech grammar; and
   commands.

8. The construction and display of speech commands method of claim 7 wherein the application is a web page.

9. The construction and display of speech commands method of claim 7 wherein the generated speech grammar and speech enabled application is stored in a flat file.

10. The construction and display of speech commands method of claim 7 wherein the generated speech grammar and speech enabled application is stored in a repository.

11. The construction and display of speech commands method of claim 7 comprising modifying the generated speech commands based on a speech recognition performance ratio.

12. The construction and display of speech commands method of claim 11 wherein the speech recognition performance ratio is based on a number of utterances correctly recognized to a total number of utterances.

\* \* \* \* \*